(12) United States Patent
Sato et al.

(10) Patent No.: US 6,239,885 B1
(45) Date of Patent: May 29, 2001

(54) IMAGE READING APPARATUS AND ADJUSTING METHOD FOR THE SAME

(75) Inventors: Hiroshi Sato; Hidemi Takayama, both of Kawasaki; Hidekazu Shimomura, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/128,254

(22) Filed: Aug. 3, 1998

(30) Foreign Application Priority Data

Aug. 8, 1997 (JP) .................................................. 9-214637

(51) Int. Cl.$^7$ ...................................................... H04N 1/04
(52) U.S. Cl. .......................... 358/483; 358/497; 358/474
(58) Field of Search .................................... 358/474, 471, 358/468, 400, 497, 483, 482, 406, 475, 504, 505, 494; 359/822, 823, 819; 250/234, 236, 208.1; 348/294, 207, 190

(56) References Cited

U.S. PATENT DOCUMENTS 5,075,539 * 12/1991 Shiraishi .......................... 250/208.1
5,267,089 * 11/1993 Yamamoto et al. .................. 359/822
5,933,248 * 8/1999 Hirata .................................. 358/406
6,157,467 * 12/2000 Tsai ...................................... 358/483

* cited by examiner

Primary Examiner—Cheukfan Lee
(74) Attorney, Agent, or Firm—Robin, Blecker & Daley (57) ABSTRACT

In an image reading apparatus having an easy-toad-just optical system, a unit is composed of a first sub-unit including an image forming lens and a second sub-unit including a solid-state image pickup element. The first sub-unit and the second sub-unit are mutually adjusted in position in X-axis, Y-axis and Z-axis while the two sub-units are also adjustable around X-axis and Z-axis. After the first sub-unit and the second sub-unit are adjusted using a tool, the unit is then assembled into the apparatus. The unit is rotated around an optical axis of the image forming lens for adjustment of perpendicularity. The unit is also rotated around a line direction of the solid-state image pickup element for adjustment of scanning synchronization (the reading position in a sub-scan direction).

9 Claims, 7 Drawing Sheets

IMAGE READING APPARATUS AND ADJUSTING METHOD FOR THE SAME

BACKGROUND OF THE INVENTION

1. Field of the Invention

The present invention relates to an image reading apparatus which reads image information of an original by forming an image representative of the image information on an image pickup element through an image forming lens, and to an adjusting method for the image reading apparatus.

2. Description of Related Art

Figure 5:
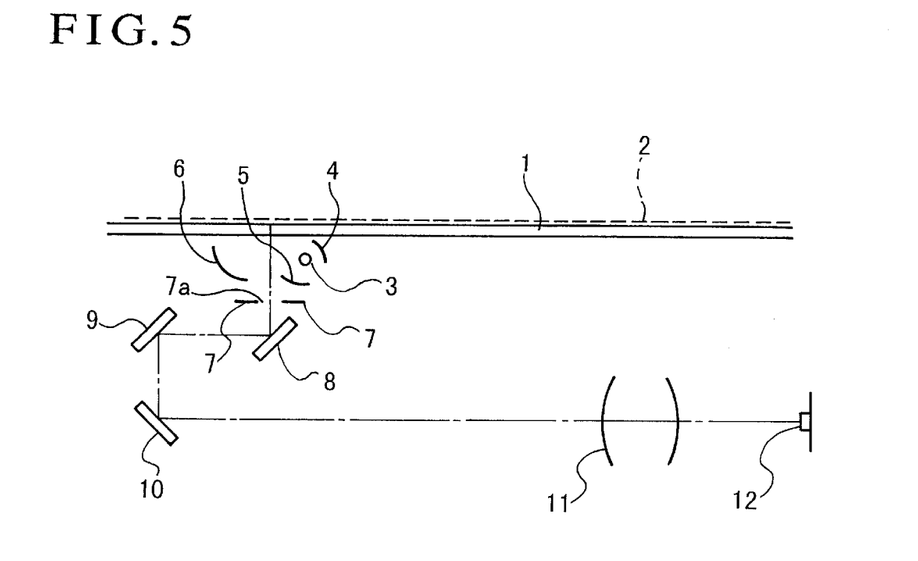
FIG. 5 is a schematic diagram showing the construction of a conventional image reading apparatus.

Heretofore, there is a known image reading apparatus, as shown in FIG. 5, which reads image information of an original or the like with a solid-state image pickup element (CCD sensor) by scanning the original by every line in a sub-scan direction.

Referring to FIG. 5, an original 2 placed onto an original-placing glass board 1 is illuminated with an illuminating light source 3, such as a halogen lamp, and reflectors 4, 5 and 6. Information light reflected from the original 2 is guided to an image forming lens 11 via a slit 7a of a slit plate 7, first to third reflecting mirrors 8, 9 and 10, and is then imaged to form an image on a solid-state image pickup element 12. The image information is thus read. While the original 2 is scanned in the sub-scan direction, the scanning speeds of the mirrors 8, 9 and 10 are set such that, letting the speed of the mirror 8 be denoted by v, the speeds of the mirrors 9 and 10 are set to be v/2.

The image information obtained on the solid-state image pickup element 12 is converted into an electrical signal. The electrical signal may be outputted to an output apparatus (not shown) as the image information to be printed, or is outputted to a storage device as the image information to be stored therein. In each case, the image reading apparatus is employed.

In the image reading apparatus having the above construction, there are two methods which are conventionally available to adjust an optical system (the reflecting mirrors, the image forming lens and the solid-state image pickup element).

Figure 6A:
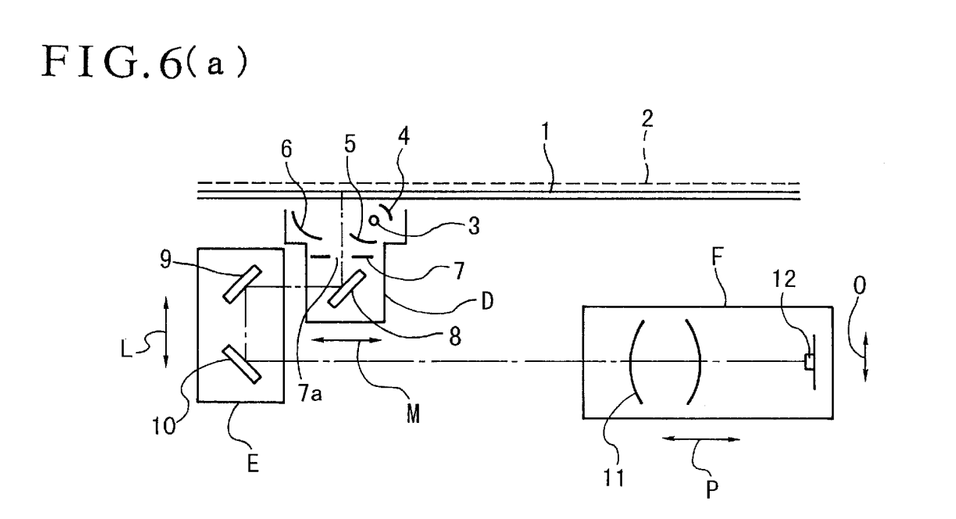
FIGS. 6(a) and 6(b) are diagrams for explaining a first conventional adjusting method.
Figure 6B:
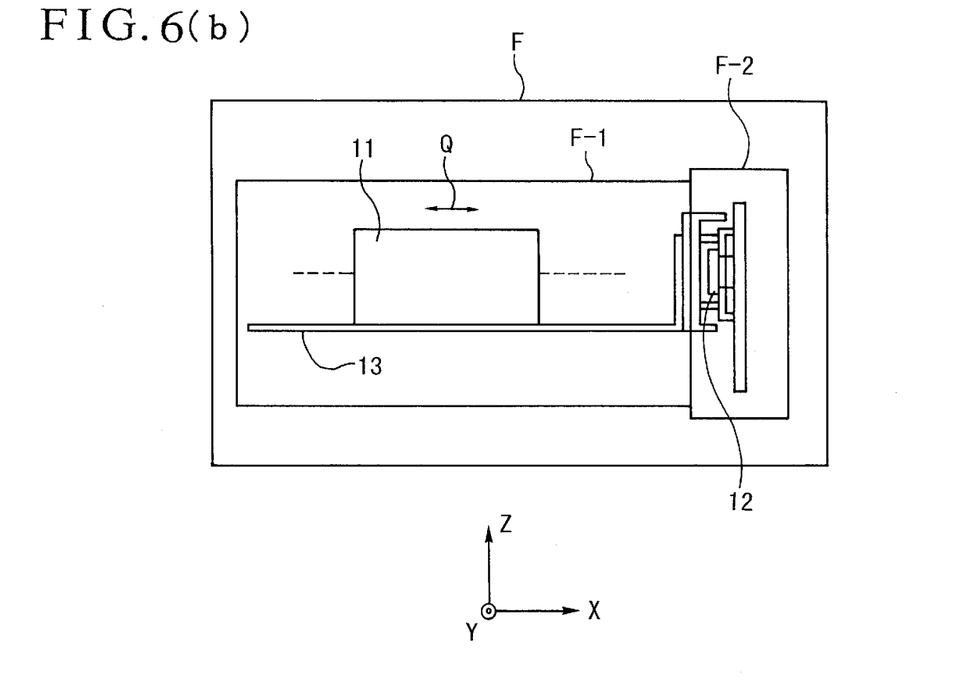

The first one of the two adjusting methods is explained by reference to FIG. 6(a) and FIG. 6(b). FIG. 6(a) is a cross-sectional view showing the body of the image reading apparatus, and FIG. 6(b) shows the details of a unit F included in the image reading apparatus body shown in FIG. 6(a). Units required to be adjusted in the image reading apparatus body are three units D, E and F. Referring to FIG. 6(a), the unit D includes the first mirror 8 and a lighting system (the illuminating light source 3, reflectors 4, 5 and 6, and slit plate 7), the unit E includes the second mirror 9 and the third mirror 10, and the unit F includes the image forming lens 11 and the solid-state image pickup element 12.

Main adjustment items for the optical system in the image reading apparatus body are as follows.

(1) Magnification
(2) Scanning synchronization in sub-scan direction
(3) Scan centering
(4) Perpendicularity to sub-scan direction
(5) Focus Referring to FIG. 6(b), the unit F is composed of a sub-unit F-1 including the image forming lens 11 and a sub-unit F-2 including the solid-state image pickup element 12. The unit F is subjected to an adjustment in a separate step prior to the assembling of the unit F onto the apparatus body so as to adjust the positional relationship between the sub-unit F-1 and the sub-unit F-2. Specifically, adjustment is performed, with respect to a mounting plate 13 of the image forming lens 11 in the sub-unit F-1, for the amounts of shift of the subunit F-2 in the directions parallel with X-axis, Y-axis and Z-axis and for the angles of rotation of the sub-unit F-2 around X-axis and Z-axis. Such adjustment is performed using tools without mirrors being involved.

After the adjustment, the sub-unit F-1 and the sub-unit F-2 are fixed-to each other through the mounting plate 13 and the like, using screws or solder. The unit F, after the adjustment, is assembled into the apparatus body and serves thereafter as a positioning reference in the apparatus body. The unit F is adjusted in the direction of height (in the direction of O in FIG. 6(a)) with respect to a guide rail (not shown) that serves as a reference for the first to third mirrors 8, 9 and 10 during the scanning operation, and is then fixed to the apparatus body. Furthermore, the unit F is adjusted in the direction of P to adjust magnification in the apparatus by compensating for an error in the optical path length.

Further, the unit D is adjusted in terms of the synchronization in scanning (the reading position in the sub-scan direction). The unit E is adjusted in the vertical direction L so that the reading position is adjusted in the direction perpendicular to a scan area.

In the first adjusting method, as discussed above, the image reading apparatus body has three main divided units D, E and F to be adjusted. If the unit F is found to be faulty after being assembled, it is replaced with a good unit without any adjustment involved. Specifically, the unit F is positioned and fixed with respect to a reference pin (not shown) adjustably movable on the apparatus body so that the unit F compensates for errors in the apparatus body (in the optical path length and the height referenced to the guide rail) and re-takes a preceding position.

Figure 7A:
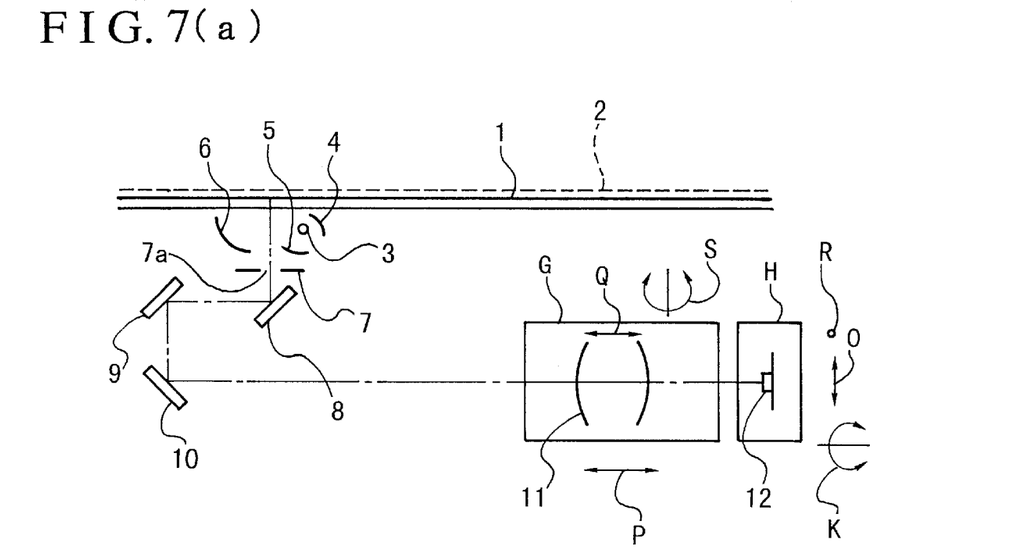
FIGS. 7(a) and 7(b) are diagrams for explaining a second conventional adjusting method.
Figure 7B:
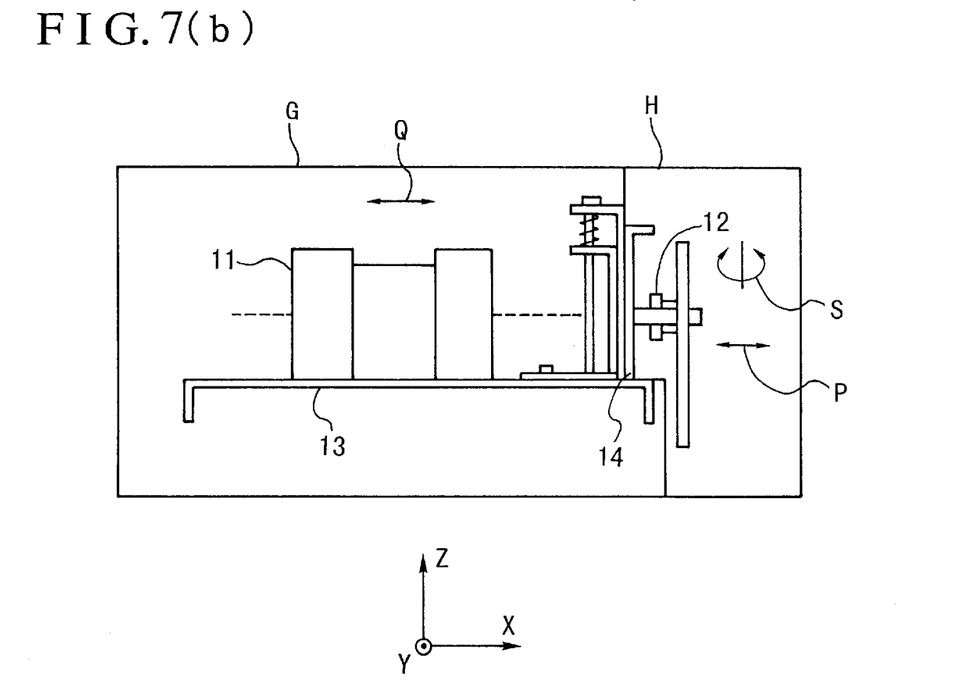

The second adjusting method needs no mirror adjustment on an image reading apparatus body, as shown in FIGS. 7(a) and 7(b). FIG. 7(a) is a cross-sectional view showing the image reading apparatus body, and FIG. 7(b) is a detailed view of units G and H included in the apparatus body. To be adjusted in the apparatus body are the unit G including an image forming lens 11 and the unit H including a solid-state image pickup element 12. The unit H needs to be adjusted in a separate step prior to its assembly into the apparatus body. In this step, the solid-state image pickup element 12, serving as a reference for the unit H, is adjusted in the direction of focus, denoted by P, relative to a mounting plate 14. This adjustment involves the movement of the unit H in parallel with X-axis and the rotation of the unit H around Z-axis. The reason why the unit H needs adjusting in the separate step is that there is a possibility that the unit H is entirely replaced after being assembled into the apparatus body.

The units G and H, assembled in the apparatus body, are adjusted in the following items.

(1) Position Q of the image forming lens 11 in the direction of focus
(2) Position P of the unit G in the direction of focus
(3) Angular position S of the unit G around Z-axis
(4) Position O of the unit H in the Z-axis direction
(5) Angular position K of the unit H around X-axis
(6) Position R of the unit H in the Y-axis direction Among the above items, the items (1) and (2) are for adjusting magnification and focus by compensating for the error in the optical path length in the apparatus body. The item 3 is for compensating for an error in the image quality of the image forming lens 11. The item 4 is for adjusting the scanning synchronization in the sub-scan direction, the item 5 is for adjusting the perpendicularity to the sub-scan direction, and the item 6 is for adjusting the scan centering.

However, in the above first adjusting method, since each of the three units D, E and F needs to be individually adjusted in the image reading apparatus body, the adjustment step is time consuming, and each unit, because of its own particular adjusting mechanism, is mechanically complex in structure.

Further, in the above second adjusting method, the number of the units to be adjusted in the image reading apparatus body is two, i.e., only two units G and H, thus being smaller than that in the first adjusting method. However, each unit in the second adjusting method has a larger number of adjusting points, and the number of overall adjustments in the apparatus body is larger. In addition, since each unit is adjusted in the apparatus body, an adjusting mechanism has to be built in each unit. The adjusting mechanism remains continuously inside the apparatus after adjustment, occupying an internal space of the apparatus body, and thereby making the apparatus body bulky and costly.

BRIEF SUMMARY OF THE INVENTION

It is an object of the present invention to reduce the number of units required to be adjusted in an image reading apparatus body. It is also an object of the present invention to reduce adjusting mechanisms by reducing adjusting steps in the apparatus body.

To attain the above objects, in accordance with an aspect of the present invention, there is provided an image reading apparatus for reading image information of an original by forming an image representative of the image information on an image pickup element through an image forming lens while scanning a surface of the original, which comprises a unit including the image forming lens and the image pickup element, and mounting means for mounting the unit rotatably in a first rotating direction around an optical axis of the image forming lens and for mounting the unit rotatably in a second rotating direction around a line direction of the image pickup element.

In accordance with another aspect of the present invention, there is provided an adjusting method for an image reading apparatus for reading image information of an original by forming an image representative of the image information on an image pickup element through an image forming lens while scanning a surface of the original, the adjusting method comprising the steps of adjusting a relative positional relationship between the image forming lens and the image pickup element in a unit including the image forming lens and the image pickup element, after that, mounting the unit in the image forming apparatus, and, after that, performing adjustment in angular position of the unit around an optical axis of the image forming lens and adjustment in angular position of the unit around a line direction of the image pickup element.

With the above arrangement, the number of the units required to be adjusted in the image reading apparatus body is reduced. Further, the adjusting points to be adjusted in the apparatus are reduced and the adjusting mechanisms are also reduced.

These and further objects and features of the present invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Figure 1A:
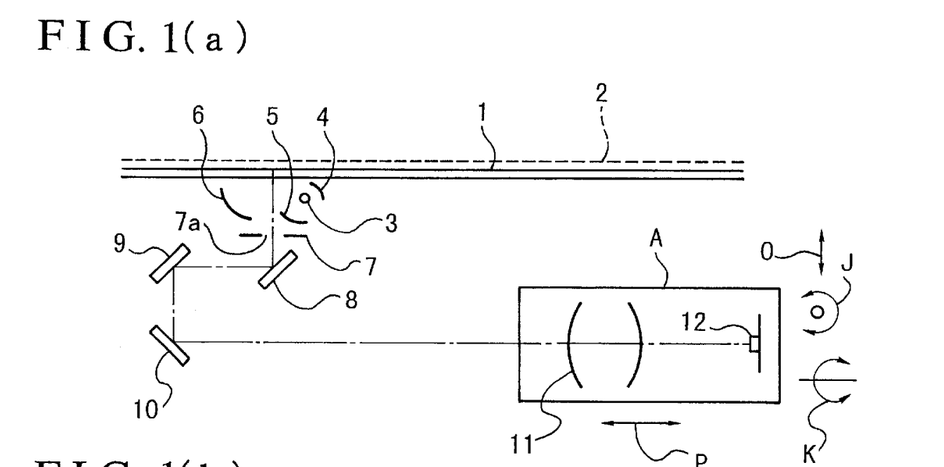
FIGS. 1(a) and 1(b) are schematic sectional views showing the construction of an image reading apparatus body and showing the construction of a unit included in the apparatus body, according to a first embodiment of the present invention.
Figure 1B:
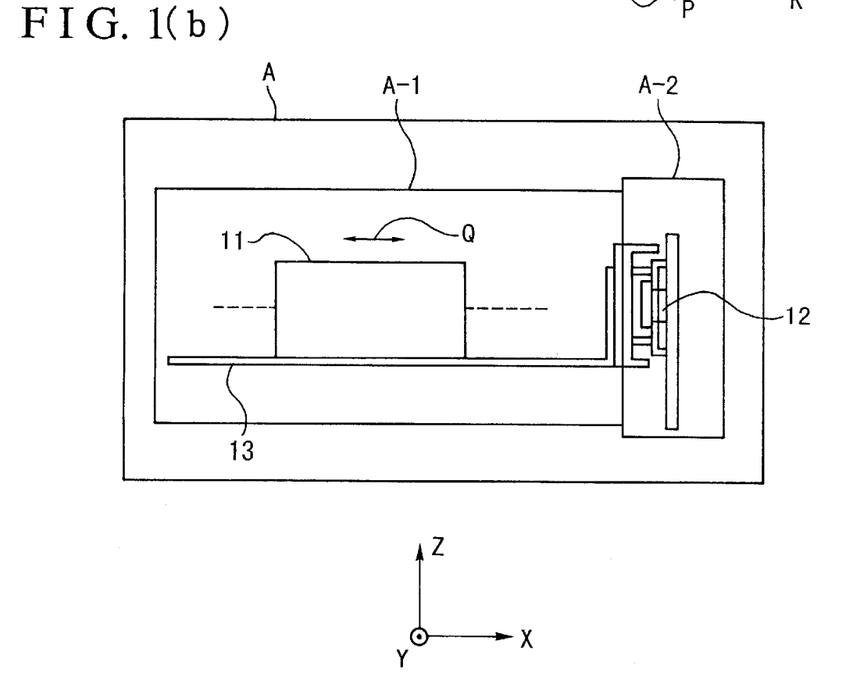

FIGS. 1(a) and 1(b) relate to a first embodiment of the invention. FIG. 1(a) is a sectional view showing the construction of an image reading apparatus body according to the first embodiment. FIG. 1(b) shows the detail of a unit A included in the image reading apparatus body. Components identical to those described with reference to FIG. 5 are denoted by the same reference numerals.

In the first embodiment, units required to be adjusted in the image reading apparatus body are reduced to the unit A only. As shown in FIG. 1(b), the unit A is composed of a sub-unit A-1 including an image forming lens 11 and a sub-unit A-2 including a solid-state image pickup element 12. In the unit A, the positional relationship between the sub-unit A-1 and the sub-unit A-2 is adjusted in a separate step prior to the assembly of the unit A into the apparatus body.

Specifically, adjustment is performed, with respect to a mounting plate 13 of the image forming lens 11 in the sub-unit A-1, for the amounts of shift of the sub-unit A-2 in the directions parallel with X-axis, Y-axis and Z-axis and for the angles of rotation of the sub-unit A-2 around X-axis and Z-axis. Such adjustment is performed using tools without mirrors involved. After the adjustment, the sub-unit A-1 and the sub-unit A-2 are fixed to each other through the mounting plate 13 and the like, using screws or solder.

The unit A, after the adjustment, is assembled into the apparatus body. The three adjustment items of the unit A to be performed in the apparatus body are listed below.

(1) Magnification and focus
(2) Scanning synchronization in the sub-scan direction
(3) Perpendicularity to the sub-scan direction The unit A is assembled into the apparatus body and serves thereafter as a reference in the apparatus body. The unit A is adjusted to be shifted in the direction of height (in the direction of O in FIG. 6(a)) with respect to a guide rail (not shown) that serves as a reference for the first to third mirrors 8, 9 and 10 during the scanning operation. Further, the unit A is adjusted to be shifted in the direction of P to adjust magnification and focus by compensating for an error in the optical path length in the apparatus body. Furthermore, the unit A is adjusted to be rotated in the rotating direction K around X-axis to perform adjustment of the perpendicularity on the reading position. In addition, by adjusting the unit A to be rotated in the rotating direction J around Y-axis, the scanning synchronization (the reading position in the sub-scan direction) is adjusted.

The feature of the adjusting method of the present invention is that units required to be adjusted in the image reading apparatus body are reduced to the unit A only. Further, when the unit A gets faulty after the installation of the apparatus, it is replaced with a good unit without the need for adjustment. Specifically, the unit A is designed to be fixed repeatedly at the same position by a reference pin (not shown) movable on the apparatus body so that the unit A is positioned with the errors (in the optical path length and the height from the guide rail) being compensated for.

To adjust the scanning synchronization, the following points should be considered. As already described, the adjustment of the scanning synchronization is performed by rotating the unit A around Y-axis (in the rotating direction J). Depending on where the axis of rotation (Y-axis) is placed on the X-axis, it is determined how much effective area of each of the mirrors 8, 9 and 10 (where a light ray is actually reflected) is required.

Figure 2A:
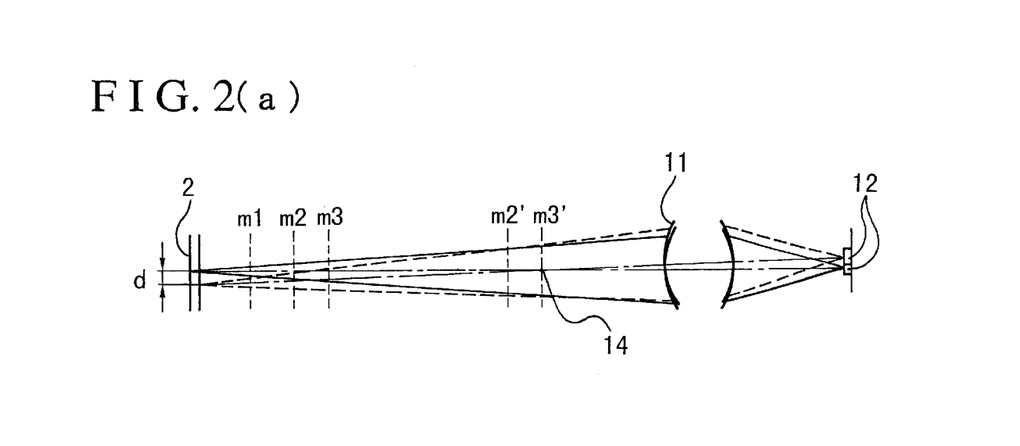
FIGS. 2(a), 2(b) and 2(c) are diagrams for explaining the adjusting method for a scanning synchronization.
Figure 2B:
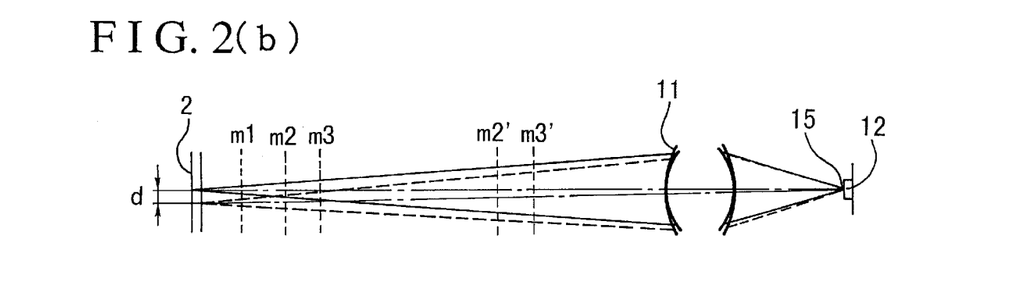
Figure 2C:
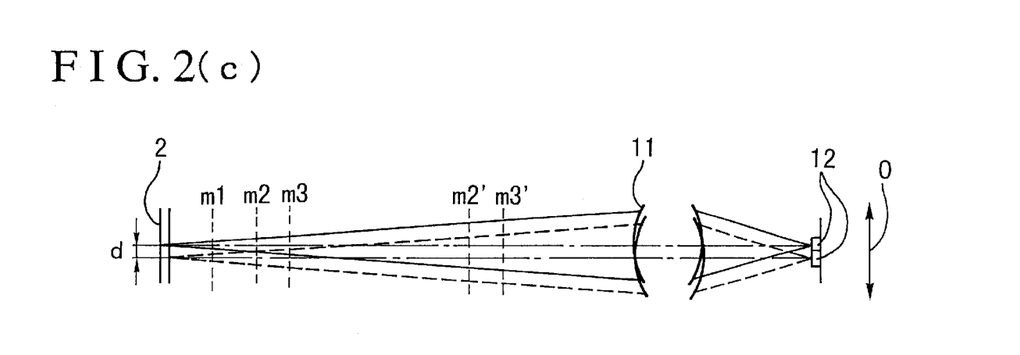

Referring to FIGS. 2(a) to 2(c), the adjustment of the scanning synchronization is next discussed.

FIGS. 2(a) to 2(c) show an optical path in a system which is assumed not to be bent by the mirrors 8, 9 and 10. Supposing that the unit A is adjusted to correct a misalignment of a distance "d" taking place on the surface of the original 2, the following adjusting steps are assumed to be taken in FIGS. 2(a) to 2(c).

FIG. 2(a): The unit A is rotated around Y-axis located at the position of a point 14.

FIG. 2(b): The unit A is rotated around Y-axis located at the position of a point 15.

FIG. 2(c): The unit A is raised or lowered in height in the direction of O, namely, in the direction of Z-axis.

Referring to FIGS. 2(a) to 2(c), m1, m2 and m3 respectively represent the positions of the mirrors 8, 9 and 10 when the front end of the original 2 is read, and m1, m2' and m3' respectively represent the positions of the mirrors 8, 9, and 10 when the rear end of the original 2 is read. Accordingly, when the original 2 is scanned, the first mirror 8 is fixed at the position m1, the second mirror 9 is moved from the position m2 to the position m2', and the third mirror 10 is moved from the position m3 to the position m3'. The effective area of each mirror becomes the widest in width to read the rear end of the original 2, namely when the mirrors are closest to the image forming lens 11.

To adjust the scanning synchronization by the rotation and shift of the unit A, the unit A is preferably rotated around the point 14 in the vicinity of position m3' where the third mirror 10 reads the rear end of the original 2. In the case of the rotation of the unit A at other positions, for example, at the point 15 on the solid-state image pickup element 12 as shown in FIG. 2(b), the effective area at the position m3' must be wider than a reference state. The same is true when the unit A is adjusted in height in the direction of O as shown in FIG. 2(c).

As described above, when the synchronization adjustment is performed by rotating the unit A around Y-axis, the unit A is preferably rotated around the axis of rotation taken in the vicinity of the position m3' where the third mirror 10 reads the rear end of the original 2. In a case where the layout of a rotation mechanism requires the axis of rotation to be placed in the vicinity of the image forming lens 11 rather than in the vicinity of the position m3', the axis of rotation is preferably placed to the side of the image forming lens 11 closer to the position m3', namely, in front of the image forming lens 11 (on the side facing the original).

Figure 3A:
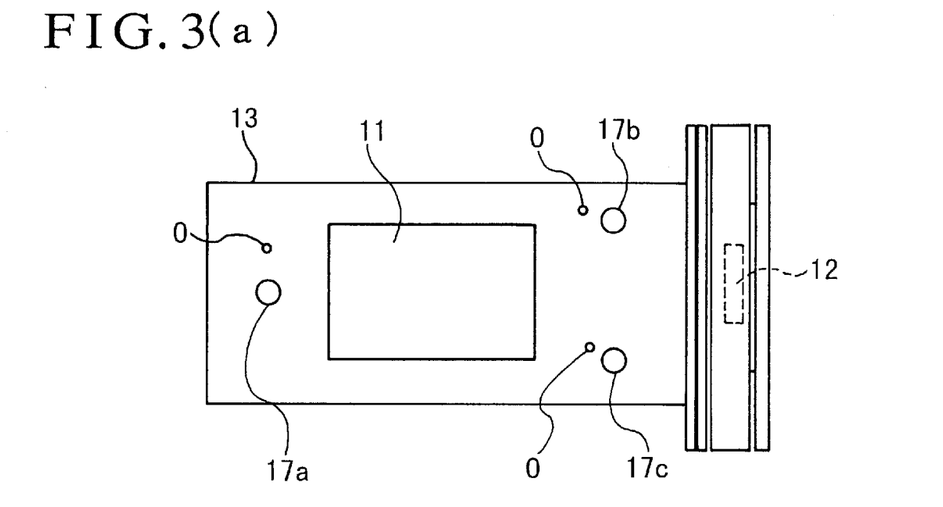
FIG. 3(a) is a top view of a unit according to a second embodiment of the present invention.
Figure 3B:
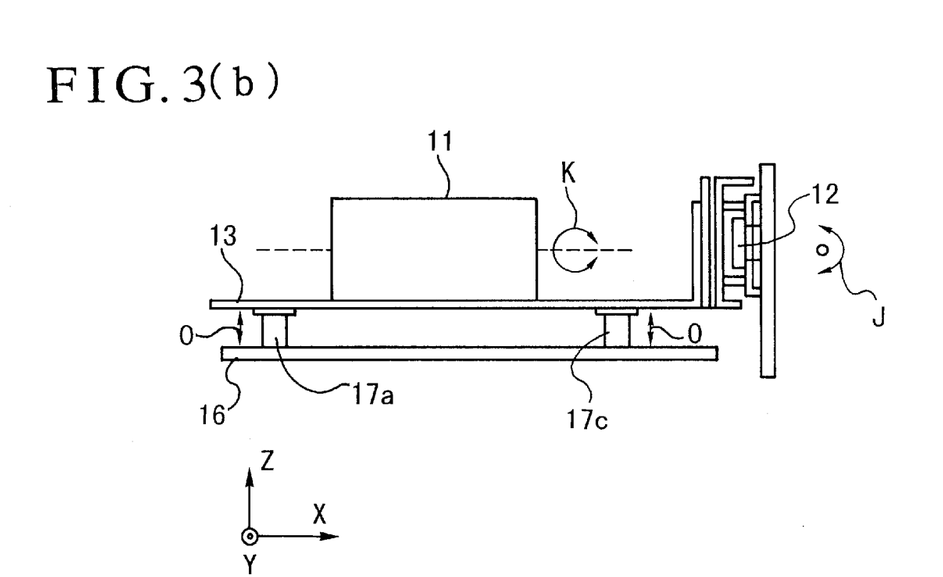
FIG. 3(b) is a side view of the unit according to the second embodiment.

FIGS. 3(a) and 3(b) relate to a second embodiment of the present invention.

As shown in FIGS. 3(a) and 3(b), in the second embodiment, there is provided a unit into which an image forming lens 11 and a solid-state image pickup element 12 are assembled into. For adjustment, the unit is rotated around the optical axis (in the direction of K) and is also rotated around the line direction Y of the solid-state image pickup element 12 (in the direction of J). A base 16 serving as a reference in height is provided below the unit. Three adjusting shafts 17a, 17b and 17c are provided to support the unit at three points so that the separation between the base 16 and the mounting plate 13 is adjusted in the vertical direction of O.

According to the second embodiment, the perpendicularity and the scanning synchronization (the reading position in the sub-scan direction) can be adjusted in the same manner as in the first embodiment.

Figure 4A:
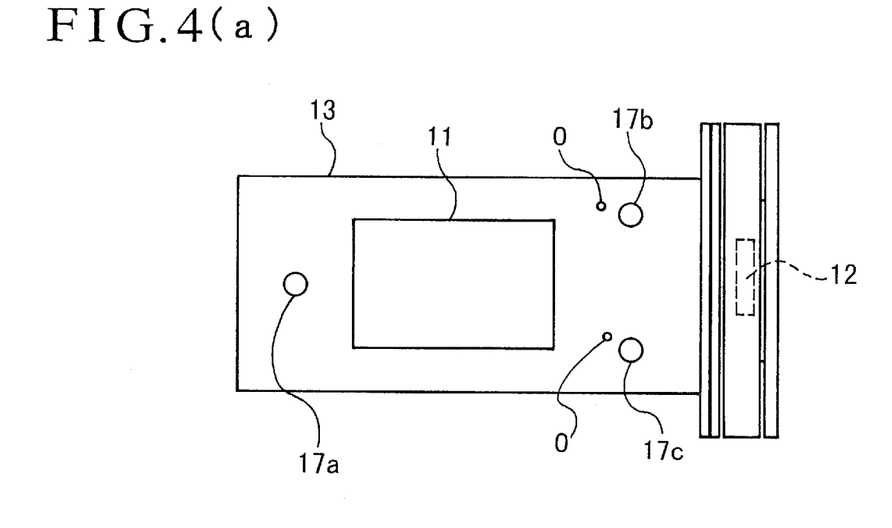
FIG. 4(a) is a top view of a unit according to a third embodiment of the present invention.
Figure 4B:
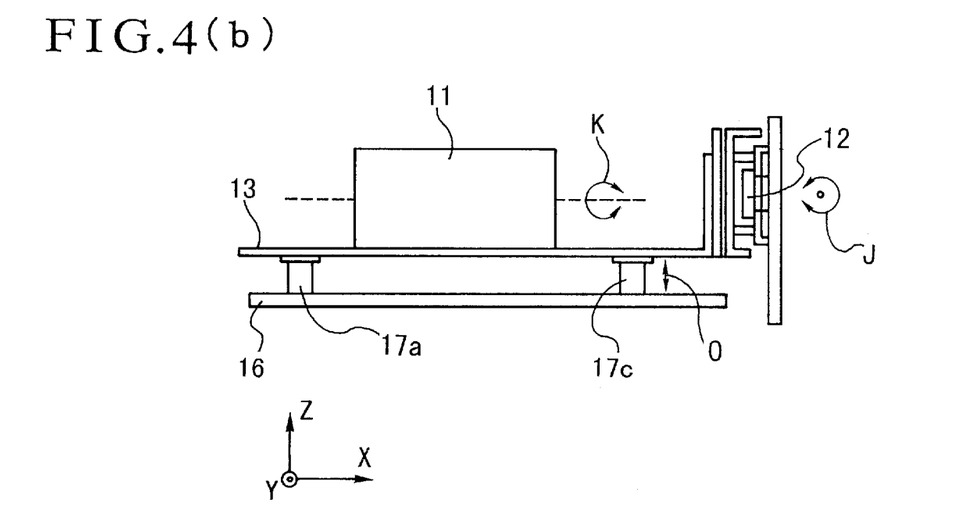
FIG. 4(b) is a side view of the unit according to the third embodiment.

FIGS. 4(a) and 4(b) relate to a third embodiment of the present invention.

As shown in FIGS. 4(a) and 4(b), the third embodiment is identical, in construction, to the second embodiment shown in FIGS. 3(a) and 3(b), except that the shaft 17a of the three shafts 17a, 17b and 17c is fixed while the remaining two 17b and 17c remain adjustable.

With this arrangement, the perpendicularity and the scanning synchronization (the reading position in the sub-scan direction) are adjusted in the same way as the first and second embodiments.

As described above, an image reading apparatus line-scans image information of an original in the sub-scan direction to read the image information with a solid-state image pickup element (such as a CCD sensor). In the adjustment procedure, a unit integrally including an image forming lens and an image pickup element, after adjustment of the positional relationship between the image forming lens and the image pickup element, is rotated around the optical axis in the apparatus while the unit is rotated around the line direction of the solid-state image pickup element. The perpendicularity and the scanning synchronization (the reading position in the sub-scan direction) are thus adjusted. This arrangement reduces the number of units required to be adjusted in the apparatus. The number of adjustment steps to be performed in the apparatus is also reduced. Further, the construction of the apparatus is simplified by reducing adjusting mechanisms left in the apparatus.

What is claimed is:

1. An image reading apparatus for reading image information of an original by forming an image representative of the image information on an image pickup element through an image forming lens while scanning a surface of the original, said image reading apparatus comprising:

a unit including said image forming lens and said image pickup element; and mounting means for mounting said unit rotatably in a first rotating direction around an optical axis of said image forming lens and for mounting said unit rotatably in a second rotating direction around a line direction of said image pickup element.

2. An image reading apparatus according to claim 1, wherein a positional relationship between said image forming lens and said image pickup element in said unit is adjustable in a first direction and in a second direction which is perpendicular to the first direction.

3. An image reading apparatus according to claim 2, wherein a positional relationship between said image forming lens and said image pickup element in said unit is adjustable in a rotating direction around an axis aligned with the first direction and in a rotating direction around an axis aligned with a third direction which is perpendicular to the first direction and the second direction.

4. An image reading apparatus according to claim 1, wherein said mounting means includes a base disposed at a reference position and a plurality of support members for respectively supporting said unit at a plurality of points on said base, and wherein each of said plurality of support members is arranged to be capable of adjusting a separation between said base and said unit at a corresponding one of the plurality of points.

5. An image reading apparatus according to claim 4, wherein said plurality of support members are three in number, and wherein two of said three support members are arranged to be capable of adjusting the separation between said base and said unit at the respective points.

6. An image reading apparatus according to claim 1, wherein said mounting means includes a base disposed at a reference position and a plurality of support members for respectively supporting said unit at a plurality of points on said base, and wherein said unit is adjustable in a direction of the optical axis.

7. An image reading apparatus according to claim 1, further comprising a mirror for guiding the image information to said image forming lens along a predetermined optical path, wherein an axis of rotation of the second rotating direction is located in the vicinity of a position of said mirror taken when a rear end part of the original is read.

8. An image reading apparatus according to claim 1, wherein an axis of rotation of the second rotating direction is located at a position on the side of said image forming lens facing the original.

9. An adjusting method for an image reading apparatus for reading image information of an original by forming an image representative of the image information on an image pickup element through an image forming lens while scanning a surface of the original, said adjusting method comprising the steps of:

adjusting a relative positional relationship between the image forming lens and the image pickup element in a unit including the image forming lens and the image pickup element;

after that, mounting the unit in the image forming apparatus; and after that, performing adjustment in angular position of the unit around an optical axis of the image forming lens and adjustment in angular position of the unit around a line direction of the image pickup element.

* * * * *

UNITED STATES PATENT AND TRADEMARK OFFICE
CERTIFICATE OF CORRECTION

PATENT NO.     : 6,239,885 B1
DATED          : May 29, 2001
INVENTOR(S)    : Hiroshi Sato et al.

It is certified that error appears in the above-identified patent and that said Letters Patent is hereby corrected as shown below:

Title page,
Item [57], delete "easy-toad-just" and insert -- easy-to-adjust --.

Column 6,
Line 49, delete "in" and insert -- in- --.

Signed and Sealed this

Thirtieth Day of April, 2002

Attest:

JAMES E. ROGAN
*Attesting Officer*  *Director of the United States Patent and Trademark Office*